United States Patent
Lee et al.

(10) Patent No.: US 7,092,635 B2
(45) Date of Patent: Aug. 15, 2006

(54) APPARATUS AND METHOD FOR STIMULATED BRILLOUIN SCATTERING SUPPRESSION USING SUPERVISORY CHANNEL

(75) Inventors: Sang-Soo Lee, Taejon (KR); Je-Soo Ko, Taejon (KR); Hyun-Jae Lee, Taejon (KR); Wang-Yuhl Oh, Taejon (KR); Dong-Yole Choi, Taejon (KR); Wan-Seok Seo, Taejon (KR)

(73) Assignees: Electronics and Telecommunications Research Institute, Taejon (KR); Korea Telecom, Sungnam (KR)

( * ) Notice: Subject to any disclaimer, the term of this patent is extended or adjusted under 35 U.S.C. 154(b) by 402 days.

(21) Appl. No.: 09/739,903

(22) Filed: Dec. 20, 2000

(65) Prior Publication Data

US 2001/0004289 A1    Jun. 21, 2001

(30) Foreign Application Priority Data

Dec. 21, 1999   (KR) ................................ 1999-59750

(51) Int. Cl.
*H04J 14/02*   (2006.01)

(52) U.S. Cl. ....................................................... 398/79
(58) Field of Classification Search ................. 398/79, 398/188, 91–92, 31
See application file for complete search history.

(56) References Cited

U.S. PATENT DOCUMENTS

| | | | |
|---|---|---|---|
| 5,329,396 A | | 7/1994 | Fishman et al. |
| 5,386,314 A | * | 1/1995 | Jopson .................... 359/326 |
| 5,851,259 A | | 12/1998 | Clayton et al. |
| 5,953,139 A | * | 9/1999 | Nemecek et al. ............. 398/79 |
| 6,023,366 A | * | 2/2000 | Kinoshita .............. 359/337.12 |
| 6,414,772 B1 | * | 7/2002 | Miyazaki .................... 398/91 |
| 6,580,539 B1 | * | 6/2003 | Moeller et al. ............... 398/79 |

OTHER PUBLICATIONS

Y. Horiuchi et al., "Stimulated Brillouin Scattering Supression Effects Induced by Cross-Phase Modulation in High Power WDM Repeaterless Transmission", Electronics Letters, vol. 34, No. 4, Feb. 19, 1998.*

L. Nelson et al., Resonances in Cross-Phase Modulation Impairment in Wavelength-Division-multiplexed Lightwave Transmission, IEEE Photonics Technology Letters, vol. 11, No. 7, Jul. 1999.*

(Continued)

*Primary Examiner*—Shi K. Li
(74) *Attorney, Agent, or Firm*—Mayer, Brown, Rowe and Maw LLP

(57) ABSTRACT

The present invention discloses an apparatus for suppressing stimulated Brillouin scattering and the method thereof that a threshold fiber input power is raised in order to prevent loss of an inputted light by stimulated Brillouin scattering being generated in a case that a signal having a strong intensity is inputted to the optical fiber and so a light signal having more strong intensity can be inputted to the optical fiber. The apparatus for suppressing the SBS includes a plurality of first transmission unit, each of which has a wavelength separation, for transmitting information signals through a signal channel; and a second transmission unit for generating and transmitting a supervisory signal of which a modulation frequency and an intensity generates a phase modulation to the plurality of information signals, through a supervisory channel. The modulation frequency and the intensity of the supervisory signal are modulated in phase to the information signals by a cross phase modulation effect, thereby broadening a line width of the information signal.

8 Claims, 2 Drawing Sheets

OTHER PUBLICATIONS

Horiuchi et al., "Stimulated Brillouin scattering suppression effects induced by cross-phase modulation in high power WDM repeaterless transmission", Electronic Letters, Feb. 19, 1998 pp. 390-391.

Franck et al., "Experimental Verification of SBS Suppression By Duobinary Modulation", Conference Publication No. 448, Sep. 22-25, 1997, pp. 71-74.

Fishman et al., "Degradations Due to Stimulated Brillouin Scattering in Multigigabit Intensity-Modulated Fiber-Optic Systems", Journal of Lightwave Technology, Nov. 1993, pp. 1721-1728.

Franck et al., "US5917638: Duo-binary signal encoding", Intellectual Property Network, Jun. 29, 1999, pp. 1-2.

* cited by examiner

APPARATUS AND METHOD FOR STIMULATED BRILLOUIN SCATTERING SUPPRESSION USING SUPERVISORY CHANNEL

FIELD OF THE INVENTION

The present invention relates to an apparatus for suppressing stimulated Brillouin scattering and the method thereof; and, more particularly, to an apparatus and a method for suppressing stimulated Brillouin scattering (SBS) which prevent a loss of an input light due to the SBS, the SBS being generated in a case that a signal having a strong intensity is inputted to the optical fiber.

DESCRIPTION OF THE BACKGROUND ART

Methods for suppressing stimulated Brillouin scattering (SBS) in a conventional art will be described as follows.

In a SBS suppression method, a separate phase modulator is used for generating a frequency chirp of signal, thereby extending a width of spectrum.

However, in the conventional method using such a phase modulator, there is a disadvantage that besides an intensity modulator used for modulating signal, an additional phase modulator must be used.

In a second SBS suppression method, in a wavelength division multiplexing (WDM) link, a width of spectrum is extended by a phase modulation through a cross phase modulation (XPM) between signal channels.

An example of the second SBS suppression method is described in a paper, Y. Horiuchi et al., "SBS suppression effects induced by XPM in high power WDM repeaterless transmission," *Electronics Letters*, vol.34, no.4, p390–391, 1998.

In the above example, the SBS generated in a wavelength division multiplexing (WDM) link of 2.5 Gb/s×8 channels is suppressed by using a cross phase modulation (XPM). As a result, although a power of +18 dBm per a channel is inputted, the SBS is not generated, thereby transmitting a signal through pure silica core fibers (SMF) of 423 km without using a repeater.

However, in the wavelength division multiplexing (WDM) link, the use of the conventional method using a phase modulation effect by cross phase modulation between the signal channels is limited, because conditions generating a phase modulation effect are determined by a transmission speed and a light intensity between each signal channel within the wavelength division multiplexing WDM channel, in a case that the transmission speed and a light intensity are changed, the phase modulation effect is also changed.

In a third method, a low frequency and a modulated amplitude are applied to a semiconductor laser, thereby extending a width of a spectrum.

The above example is described in U.S. Pat. No. 5,329,396 filed by D. A. Fishman, entitled as "Reduction of stimulated Brillouin scattering in a fiber having reduced Brillouin scattering", and issued on Jul. 12, 1994.

In such an example, as a method that a critical value of stimulated Brillouin scattering (SBS) being generated in an optical fiber is raised up, a waveform of a low frequency is applied to a general laser diode (LD) and modulated it and so a valid line width of the laser diode (LD) is extended, thereby raising up the critical intensity of stimulated Brillouin scattering.

However, although the conventional method for applying a low frequency and a modulated amplitude to the semiconductor laser is widely used, in a case that a direct modulation can not apply, like an optical fiber laser, it is impossible to adapt.

In a fourth method, a duobinary method is used as a modulation method.

The above example is described in U.S. Pat. No. 5,917,638 filed by F. Thorkild et al., entitled as "Duo-binary signal encoding", and issued on Jun. 29, 1999.

In the above example, in order to raise up the threshold of stimulated Brillouin scattering (SBS) phenomenon, a duobinary modulation method is used as a modulation method of a transmission light, thereby raising up the threshold of stimulated Brillouin scatting SBS. By using this method, when comparing it to the conventional binary modulation method, the threshold of stimulated Brillouin scattering (SBS) is increased by 12.6 dB at a transmission speed of 10 Gb/s and at this time, power penalty is less than 1 dB.

However, in the conventional method using the duobinary modulation method, a new method, unlike the conventional modulation method, must be used, the implementation method is complicate and its technology is not yet completed until now.

In a fifth method, there is a method that an optical fiber in which stimulated Brillouin scattering dose not well generated is used.

The above example is described in U.S. Pat. No. 5,851,259 filed by J. B. Clayton et al., entitled as "Method for making Ge-doped optical fibers having reduced Brillouin scattering", and issued on Dec. 22, 1998.

In the above example, when making an optical fiber being added germanium Ge, in case that a properly modulated tension is applied, stimulated brillouin scattering can be suppressed without a loss of the optical fiber and a large change of a value of dispersion. At this time, the used tension is modulated by 10–50 g in a low case and 150–200 g in a high case.

However, in the conventional method using an optical fiber in which stimulated brillouin scattering SBS does not generated in well, there are several disadvantages that a conventional optical fiber can not be used and all optical fibers must be embedded in new.

SUMMARY OF THE INVENTION

Therefore, it is an object of the present invention to provide an apparatus for suppressing stimulated Brillouin scattering and the method thereof, which is unlike a conventional method for suppressing stimulated Brillouin scattering that a separate device such as a phase modulator for suppressing stimulated Brillouin scattering SBS is equipped, or a new modulation method is introduced or new optical fibers are embedded, in which a phase modulation effect is generated by using a cross phase modulation effect being generated in a signal channel by a modulation of a supervisory channel in WDM links and the stimulated Brillouin scattering threshold is increased and as a result, stimulated Brillouin scattering is suppressed.

In accordance with an aspect of the present invention, there is provided an apparatus for suppressing stimulated Brillouin scattering using supervisory channel in WDM links, including: a plurality of first transmission units, each of which has a wavelength distance, for transmitting information signals through a signal channel; and a second transmission unit for generating and transmitting a supervisory channel of which a modulation frequency and an intensity generates a phase modulation to the plurality of information signals, through a supervisory channel, wherein the modulation frequency and the intensity of the supervisory channel are modulated in phase to the information signals by a cross phase modulation effect, thereby broadening a line width of the information signal.

The apparatus according to the present invention further includes: a multiplexing unit for multiplexing output signals of the plurality of first transmission unit and the second transmission unit; a first amplifying unit for amplifying the multiplexed signal by the multiplexing unit and then transmitting it to the transmission unit; a second amplifying unit for amplifying the signal transmitted through the transmission unit; a demultiplexing unit for demultiplexing the amplified signal by the second amplifying unit and separating signals for the signal channel and the supervisory channel; a first receiving unit for detecting signal for the signal channel separated by the demultiplexing unit; and a second receiving unit for detecting signal for the supervisory channel separated by the demultiplexing unit.

In accordance with another aspect of the present invention, there is provided a method for suppressing stimulated Brillouin scattering using a supervisory channel comprising: a) transmitting information through a signal channel having an appropriate wavelength distance; b) transmitting a supervisory signal through a supervisory channel having a modulation frequency and intensity generating a phase modulation to the plurality of signal channels by a cross phase modulation effect; and c) modulating the intensity of the supervisory channel and modulation frequency in phase to the signal channel by the cross phase modulation effect and the line width of the light signal is extended and then transmitted.

The method according to the present invention further includes the steps of: d) multiplexing the signals of the signal channels of the step a) and the supervisory channel of the step b); e) amplifying the multiplexed signal and then transmitting to the step c); f) amplifying the transmitted signal by the step c); g) demultiplexing the amplified signal by the step f) and then separating signals of the signal channel and the supervisory channel; h) detecting the separated signal for the signal channel; and i) detecting the separated signal for the supervisory channel.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

An apparatus for suppressing stimulated Brillouin scattering in accordance with a preferred embodiment of the present invention will now be described with reference to the accompanying drawings.

Figure 1:
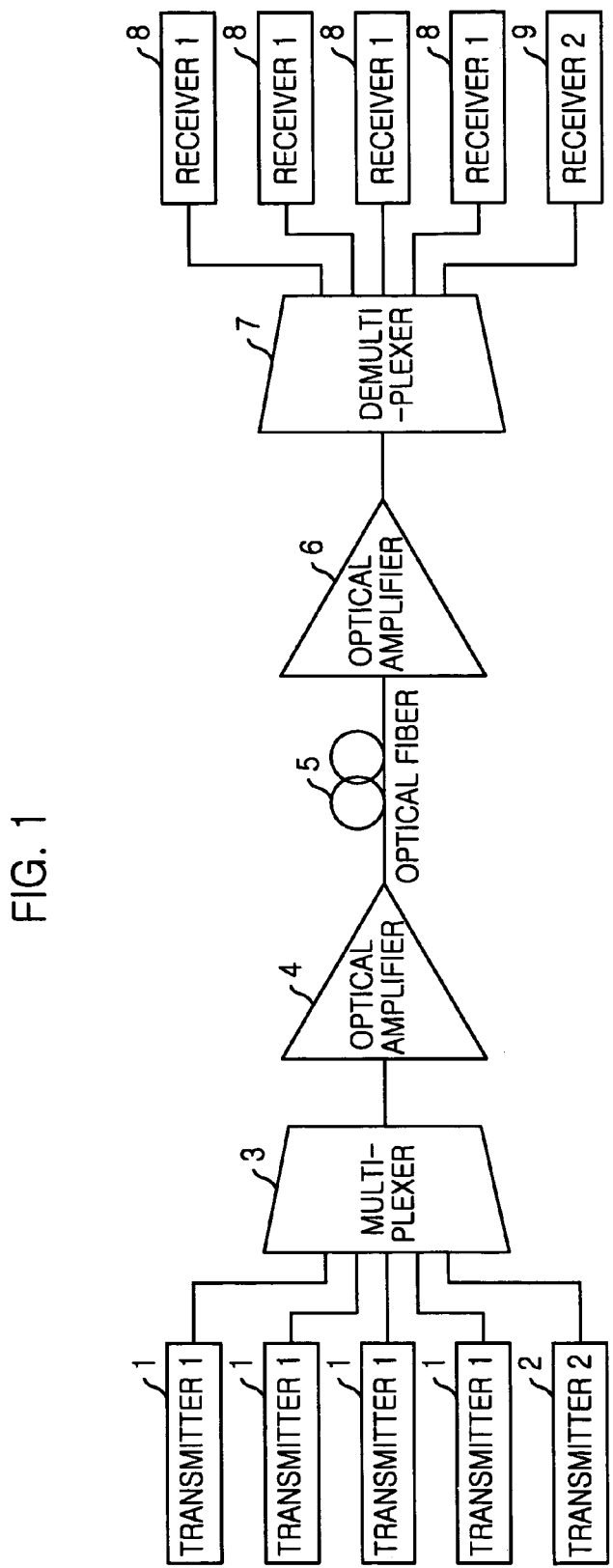
FIG. 1 is a view illustrating an example of an apparatus for suppressing stimulated Brillouin scattering and the method thereof using a supervisory channel of a WDM links in accordance with the present invention.

FIG. 1 is a view illustrating an example of an apparatus for suppressing stimulated Brillouin scattering and the method thereof using a supervisory channel of a WDM links in accordance with the present invention.

An apparatus for suppressing stimulated Brillouin scattering using a supervisory channel of a WDM links in accordance with the present invention includes a plurality of first transmitters 1, a second transmitter 2, a multiplexer 3, a first optical amplifier 4, an optical fiber, a second optical amplifier 6, a demultiplexer 7, a plurality of first receivers 6 and a second receiver 9.

Each of the transmitters 1 has an appropriate wavelength distance being used as a signal channel in order to transmit information at a wavelength division multiplexing (WDM) link. The second transmitter 2 is used as a supervisory channel for supervising the wavelength division multiplexing (WDM) link system and having a modulation frequency and a frequency intensity for generating a phase modulation to a plurality of signal channels by a cross phase modulation effect. The multiplexer 3 multiplexes the output signals from the plurality of first transmitters 1 and the second transmitter 2. The first optical amplifier 4 amplifies the multiplexed signal from the multiplexer 3. The optical fiber 5, as a transmission medium, in which the amplified signal by the first optical amplifier is propagated and the intensity and the modulation frequency of the supervisory channel are modulated in phase to the signal channel by a cross phase modulation effect and a line width of the light signal is extended and then transmitted. The second optical amplifier 6 amplifies the transmitted signal through the optical fiber 5. The demultiplexer 7 demultiplexes the amplified signal from the second optical amplifier and then separating signals for a signal channel and a supervisory channel. The plurality of first receivers 8 detect signal for a signal channel of a wavelength division multiplexing (WDM) links among the separated signals by the demultiplexer 7. The second receiver 9 detects signal for a supervosory channel of a WDM links among the separated signals by the demultiplexer 7.

An operation of the embodiment of the present invention will be described as follows.

As shown in FIG. 1, in a WDM links, the signal channels allocated with an appropriate wavelength separation and a supervisory channel having a low transmission speed compared to a general signal channel for supervising a system are transmitted together. Such signals of the signal channels and the supervisory channel are demuliplexed by the demultiplexer 3 and amplified by the first optical amplifier 4 and then inputted to the transmission optical fiber 5.

At this time, if the intensity and the modulation frequency of a supervisory channel are satisfied a condition generating a cross phase modulation, as a non-linear phenomenon producing in the optical fiber 5, as a result, a phase modulation is generated in the signal channels. That is, by controlling the modulation frequency and intensity of the supervisory channel in order to generate a cross phase modulation, in the optical fiber 5, a phase modulation is generated by the cross phase modulation effect between the signal channels and the supervisory channel. At this time, the generated cross phase modulation is shown at only the signal channel by the modulation frequency and intensity of the supervisory channel.

As mentioned above, although a separate phase modulator does not used, because the apparatus of the present invention functions as a role that extends the line width of the light source, the threshold of stimulated Brillouin scattering capable of being occurring in the signal channel is raised up. Accordingly, although the intensity of the signal channel capable of inputting an optical fiber is increased and the generation of stimulated Brillouin scattering is suppressed and so transmission at a long distance become possible.

Signals being transmitted through the optical fiber 5 and the second optical amplifier 6 are separated with each channel through the demultiplexer 7 and thereafter the separated signal channel is inputted to a plurality of first receivers 8 and the separated supervisory channel is inputted to the second receiver 9, respectively, thereby transmitting information.

Figure 2:
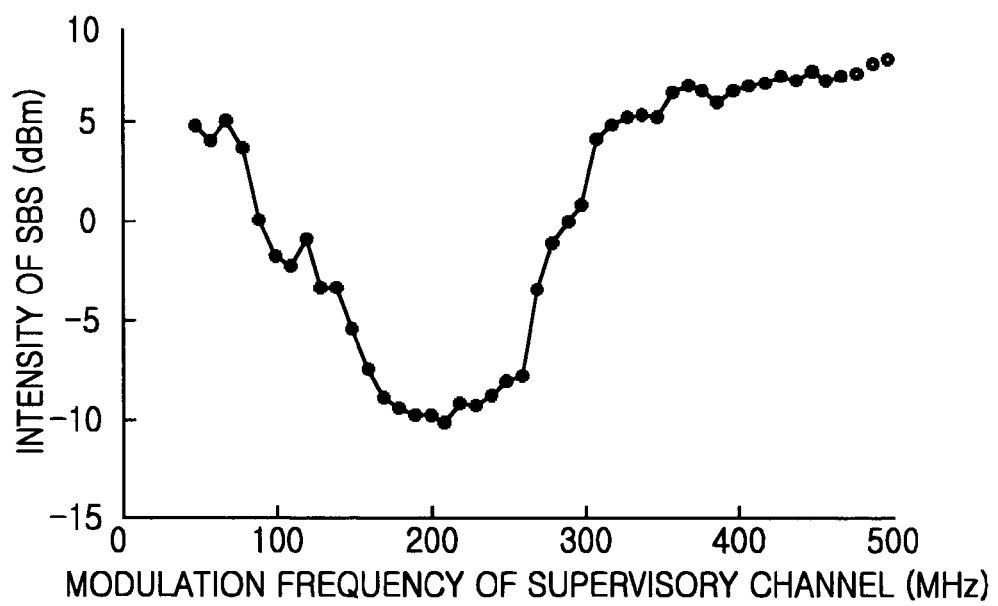
FIG. 2 is a graph illustrating an experiment result in which stimulated Brillouin scattering is suppressed by an apparatus for suppressing stimulated Brillouin scattering.

FIG. 2 is a graph illustrating an experimental result in which stimulated Brillouin scattering is suppressed by an invented apparatus for suppressing stimulated Brillouin scattering. In the FIG. 2, in a case that a modulation frequency of the supervisory channel is 150~250 MHz, the stimulated Brillouin scattering become minimized.

As mentioned above, in the conventional WDM links, a threshold fiber input power of stimulated Brillouin scattering being generated in a signal channel by only using a supervisory channel can be raised, without using an additional separate device, in particular, in a case that when using an additional device, like an optical fiber laser, a direct modulation is difficult, the method of the present invention can be also used valuably.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. An apparatus for suppressing stimulated Brillouin scattering (SBS) in an optical transmission system, comprising:

a plurality of first transmission means, each of which has a wavelength separation, for transmitting information signals through a signal channel; and a second transmission means for generating and transmitting a supervisory signal having a modulation frequency in a range of approximately 150 MHz to approximately 250 MHz and an intensity to generate a phase modulation to the plurality of information signals, through a supervisory channel, wherein the modulation frequency and the intensity of the supervisory signal are modulated in phase to the information signals to control a cross phase modulation effect, thereby broadening a line width of the information signal.

2. The apparatus as recited in claim 1, further comprising:

a multiplexing means for multiplexing output signals of the plurality of first transmission means and the second transmission means;

a first amplifying means for amplifying the multiplexed signal from the multiplexing means and then transmitting it to a transportation means;

a second amplifying means for amplifying the signal transmitted through the transportation means;

a demultiplexing means for demultiplexing the amplified signal by the second amplifying means and separating signals to the information signals and the supervisory signal;

a first receiving means for detecting the separated by the demultiplexing means; and a second receiving means for detecting signal for the supervisory signal separated by the demultiplexing means.

3. The apparatus as recited in claim 1, wherein the second transmission means controls the modulation frequency and intensity to the information signal in order to generate a phase modulation by a cross phase modulation effect.

4. The apparatus as recited in claim 3, wherein the second transmission means controls the modulation frequency and intensity to only the information signal in order to generate a cross phase modulation by a modulation of the supervisory signal.

5. A method for suppressing stimulated Brillouin scattering in an optical transmission system, comprising the steps of:

a) transmitting information signals through a signal channel, each information signal having a wavelength separation; and b) generating and transmitting a supervisory signal having a modulation frequency in a range of approximately 150 MHz to approximately 250 MHz and an intensity to generate a phase modulation to the plurality of information signals, through a supervisory channel, wherein the modulation frequency and the intensity of the supervisory signal are modulated in phase to the information signals to control a cross phase modulation effect, thereby broadening a line width of the information signal.

6. The method as recited in claim 5, further comprising the steps of:

d) multiplexing the information signals and the supervisory channel;

e) amplifying and transmitting the multiplexed signal;

f) amplifying the transmitted signal;

g) demultiplexing the amplified signal at the step f) and then separating the signals into the information signal and the supervisory signal;

h) detecting the information signal the separated signal; and i) detecting the supervisory signal.

7. The method as recited in claim 5, wherein the step b) controls the modulation frequency and intensity to the signal channel in order to generate a phase modulation by a cross phase modulation effect.

8. The method as recited in claim 7, wherein the step b) controls the modulation frequency and intensity to only the signal channel in order to generate a cross phase modulation by the modulation of the supervisory channel.

* * * * *